United States Patent Office 3,288,670
Patented Nov. 29, 1966

3,288,670
PROCESS AND COMPOSITIONS FOR
CONTROLLING PLANT GALLS
Milton N. Schroth, El Cerrito, Calif., assignor to The
Regents of the University of California, Berkeley, Calif.
No Drawing. Filed July 13, 1965, Ser. No. 471,755
17 Claims. (Cl. 167—31)

This invention pertains to an agrochemotherapeutic process and composition, and is more particularly directed to a method and composition for controlling galls on plants (plant tumors). Control of galls is achieved, in accordance with this invention, by applying a composition comprising oil, cresol, and xylenol to the galls.

There are many different kinds of galls on plants just as there are many different kinds of tumors in animals. They are hyperplastic growths or excrescences of plant tissues resulting from irritation due to parasites. Fungi, bacteria, insects, and probably viruses cause irritations in plant tissues which can stimulate excrescence. Illustratively, one of the widespread and economically important galls of plants is crown gall.

Crown gall is a representative hyperplastic growth on plants that Dr. Erwin F. Smith, of the United States Department of Agriculture, has called a "plant cancer." The galls occur at about ground level at about the juncture of the stem and the roots. Hence, the name "crown gall."

Crown galls are caused by a bacterium, *Agrobacterium tumefaciens,* that lives in the soil, and which invades the growing tissues of plants via wounds in the epidermis and cortex. Wounds caused by cuts, abrasions, and chewing insects provide sites for the bacterial invasion, and among susceptible nursery stock and even established trees in heavily infested soils the incidence of crown gall can be very high. There are estimates that nurseries sometimes must discard some 20 up to even 70 percent of young trees, brambles, and shrubs at the time they are dug prior to transplanting. Moreover, crown gall is a serious disease problem throughout the world, especially in warm, humid areas. A recent report in Plant Disease Reporter [vol. 45, p. 823 (1961)] describes severe damage in nurseries and stone fruit orchards (especially almond rootstocks) in Israel.

After *Agrobacterium tumefaciens* infects the growing tissues of the plant, the normal processes of cell reproduction and growth become disorganized locally, and there is uncontrolled proliferation and hyperplasia of abnormal cells. [See Kupila, Cancer Research 23, pp. 497–509 (1963).] Crown galls range in size from incipience to several inches in diameter on brambles such as roses, blackberries and raspberries. On the other hand, trees may have galls considerably larger, partly or completely surrounding a main root or the trunk. The galls interfere with normal transport of nutrients and fluids in the affected plant and thus weaken it and interfere with growth and productivity.

It has now been found, in accordance with this invention, that plant gall tissues are killed by a mixture of oil, cresol and xylenol. Hence, a composition according to this invention can be applied to plant galls in order to kill the hyperplastic tissues and thus save the plant. As noted, crown galls are one kind of plant gall that can now be controlled, but other kinds of plant galls are also controlled in accordance with the method and composition of this invention.

In accordance with one embodiment of the invention, established crown galls are effectively killed with an aqueous emulsion consisting of water, kerosene, m-cresol, and 2,4-xylenol. In accordance with a preferred embodiment of the invention, aromatic hydrocarbons, for example, 1,2,3,4-tetrahydronaphthalene (Tetralin), diphenylmethane, and dimethylnaphthalene are included along with the oil, cresol, and xylenol. Tricresol, o-cresol, p-cresol, 2,3-xylenol, 3,4-, 2,6-, 3,5-, and 2,5-xylenol can be used to replace all or part of the preferred m-cresol and 2,4-xylenol. Minor amounts of durenol, isodurenol, mesitol, m-benzyltoluene, p-benzyltoluene, α-naphthol, other alkylated naphthalenes and like aromatic compounds can also be included.

Aqueous emulsions are a preferred form of the oil, cresol, and xylenol mixtures, because emulsions can be prepared having desirable consistencies for application. For example, emulsions of paint-like consistency are preferred for individual treatment of galls on trees in orchards and for dipping rootstocks. In accordance with suitable practice of the invention, an established crown gall can be exposed and "painted" with a paint-like emulsion. Such an emulsion is fluid enough to readily penetrate the fissures of the bark, but not so fluid as to run off and disperse in the soil. A paint-like emulsion will also effectively cling to the roots and lower stems of dipped rootstocks.

The oil, cresol, and xylenol mixtures of this invention can also be sprayed onto infected trees, brambles, and shrubs for control of crown gall. They can be applied to the major limbs and scaffolding of olive trees for control of olive knot, and to other shrubs, brambles, and trees for control of rust galls, bacterial canker (*Pseudomonas syringae* canker), oak galls, brown rot cankers, ceratocystis cankers, cytospora cankers, and similar diseases.

Aqueous emulsions according to the invention are more readily prepared and stabilized when an emulsifying agent is included. Suitable emulsifying agents include nonionic surfactants, illustratively, polyoxyethylene sorbitol fatty acid esters (Altox 1086), polyglycol esters of fatty acids (emulsifiers 2, 3, and M–O–1, Kessler Chemical Co), fatty acid alkanolamides (Ninol 201), polyethoxy esteramides (Leyco E–150), alkylphenyl polyethylene glycol ethers (Tergitol NPX, Tergitol NP–27, Triton NP–56, Triton X–45, Triton X–100, Triton X–155 and Hyonic PE–30), and modified phthalic glycerol alkyd resins (Triton B–1956); anionic emulsifying agents such as ethylene oxide aromatic sulfonate condensates (Agrimul GA), amine salts of fatty alcohol sulfates (Duponol G), and amine salts of alkylaryl sulfonates (Ninate 411, Trepolate-YLA); cationic emulsifying agents such as alkyl polyoxyethylene amines, e.g., Katapol PN–430 (a preferred emulsifying agent in accordance with this invention) and Ethomeen C/15; and blends of sulfonated oils and polyalcohol carboxylic acid ester (Emcol H–77), blends of polyoxyethylene ethers and oil-soluble sulfonates (Emcol H–400), blends of alkylarylsulfonates and alkylphenoxy polyethoxy ethanols (Tritons X–151, X–161, and X–171), e.g., about equal parts of sodium kerylbenzene sulfonate and isooctylphenoxypolyethoxyethanol containing about 12 ethoxy groups, and blends of calcium alkylarylsulfonates and polyethoxylated vegetable oils (Agrimul $N_4S$).

A satisfactory emulsion can also be prepared by including a fatty acid in the mixture along with a tertiary amine salt forming agent. Illustrative fatty acids are stearic (preferred), lauric, oleic, myristic and palmitic acids. Illustrative tertiary amine, salt forming agents are triethanolamine, monoethanolamine, monoisopropanolamine, methyldiethanolamine, triisopropanolamine, and the like.

The proportion of oil in the mixtures of this invention can range from about 4% to about 75%. A preferred range is about 30% to about 65%. Any non-volatile, non-phytotoxic oil is suitable although kerosene is preferred. By non-volatile is meant oils having less volatility than the so-called dry-cleaning solvents which have a boiling range of 300–400° F. (ASTM D484–4). Advantageously, however, the oil is more volatile than No. 2 fuel oil (boiling range 450–675° F.). Non-aromatic, mineral oils like No. 1 fuel oil and kerosene which have a boiling range in the order of 350° to 550° F. are most suitable. Heavier oils such as No. 2 fuel oil and the summer oils used in agricultural sprays can also be used but generally give lower efficiency.

The proportion of cresol and xylenol can range from about 0.05% to about 3% each. A preferred range is about 0.1% to about 0.5% each. Likewise, the proportion of aromatic hydrocarbons, (e.g., 1,2,3,4-tetrahydronaphthalene, diphenylmethane, and dimethylnaphthalene) can range from about 0.05% to about 5.0% each. A preferred range is about 0.1% to about 2.0% each. The proportion of emulsifying agent can range from about 3% to about 18%.

Formulations according to this invention for treating crown galls on walnut trees advantageously include pentachlorophenol. It has been found, for example, that crown galls on the hybrid walnut (Paradox, a cross of English walnut and black walnut) can be successfully treated with a mixture according to this invention having about 3% each of cresol and xylenol, and 4% each of Tetralin, diphenylmethane and dimethylnaphthalene, and about 2% pentachlorophenol.

In the treatment of plant tumors according to this invention the oil, cresol, and xylenol composition is applied directly to the gall. As in the case of olive knot, direct application to the major limbs and scaffolding is effective. On the other hand, crown galls are localized and treatment of the specific situs is indicated. Galls on established, valuable trees can be exposed by any convenient means and the composition applied as an aqueous emulsion. Nursery stock can be treated at the time of digging for resale. In general, roots of nursery stock can be dipped in an aqueous emulsion and wrapped if desired. Rootstock dips are advantageously somewhat more fluid than the "paints" for individual direct treatments. Such dips, should however, be of a consistency suitable to promote thorough coating and adherence to the treated rootstock.

The following examples are illustrative of the process and products of the present invention, but are not to be constructed as limiting.

Example 1

A mixture comprising 45.5% kerosene, 0.29% m-cresol, 0.29% 2,4-xylenol, 0.33% 1,2,3,4-tetrahydronaphthalene, 0.34% diphenylmethane, 0.34% dimethylnaphthalene, 12.4% of an alkyl polyoxyethylene amine (Katapol PN–430), 2.2% stearic acid, and 38.4% water was prepared by mixing 1551 gm. kerosene, 8.82 gm. m-cresol, 9.76 gm. 2,4-xylenol, 11.09 gm. 1,2,3,4-tetrahydronaphthalene, 11.47 gm. diphenylmethane, 11.58 gm. dimethylnaphthalene, 423 gm. Katapol PN–430, and 75 gm. stearic acid, and then slowly adding 1310 gm. water to the mixture with stirring. The thus-obtained aqueous emulsion was applied to crown galls on almond trees (grafts on peach rootstock). The galls were exposed by hydraulic removal of soil with a high-pressure jet of water. The exposed galls were allowed to dry before application of the emulsion. The emulsion was applied with a paint brush so as to thoroughly coat the gall tissue. The gall was left exposed. After about 4 months, all the treated galls were dead and removable by simply knocking them off the stem of the tree. One gallon of the described composition is sufficient for about 200 trees in a young orchard.

Example 2

A formulation comprising 60% kerosene, 0.2% m-cresol, 0.02% 2,4-xylenol, 12% Katapol PN–430, and 27.6% water was mixed to form an emulsion of paint-like consistency. The emulsion was applied to Lovell peach rootstocks by dipping the roots and lower stems of the plants. The treated rootstocks were planted in soil infected with *Agrobacterium tumefaciens*. When examined 7 months later there were no crown galls on any of the transplants.

Example 3

A formulation comprising 45.5% kerosene, 0.29% m-cresol, 0.29% 2,4-xylenol, 0.33% 1,2,3,4-tetrahydronaphthalene, 0.34% diphenylmethane, 0.34% dimethylnaphthalene, 7.3% stearic acid, 7.3% triethanolamine, and 38.4% water was applied to crown gall infected almond trees. The galls were killed in every instance and could be easily removed from the stems of the trees. The trees appeared vigorous and healthy thereafter.

Example 4

Potted oleander plants growing in a greenhouse were sprayed with the formulation of Example 1. All the galls were killed and the plants remained healthy and actively growing.

Example 5

The same formulation as that of Example 1, except that 8% Katapol PN–430 was used instead of 12.4%, was applied to about 500 knots on the branches of 40 year old olive trees. All the knots were killed.

Example 6

Other compositions comprising oil, m-cresol, 2,4-xylenol, and an emulsifying agent suitable for application to plant galls for killing and removing the abnormal growths are as follows:

| A | Gm. | Percent |
|---|---|---|
| Kerosene | 1,861.7 | 54.66 |
| m-Cresol | 15.7 | 0.46 |
| 2,4-xylenol | 15.6 | 0.46 |
| 1,2,3,4-tetrahydronaphthalene | 73.6 | 2.16 |
| Diphenylmethane | 76.1 | 2.23 |
| Dimethylnaphthalene | 76.8 | 2.25 |
| Triethanolamine | 281.0 | 8.25 |
| Stearic acid | 120.0 | 3.52 |
| Water | 885.0 | 25.9 |

| B | Gm. | Percent |
|---|---|---|
| Kerosene | 1,861.7 | 54.8 |
| m-Cresol | 7.85 | 0.23 |
| 2,4-xylenol | 7.8 | 0.23 |
| 1,2,3,4-tetrahydronaphthalene | 36.8 | 1.08 |
| Diphenylmethane | 38.1 | 1.11 |
| Dimethylnaphthalene | 38.4 | 1.12 |
| Triethanolamine | 281.0 | 8.27 |
| Stearic acid | 120.0 | 3.53 |
| Water | 1,010.0 | 29.7 |

| C | Gm. | Percent |
|---|---|---|
| Kerosene | 70 | 4.0 |
| m-Cresol | 15 | 0.86 |
| 2,4-xylenol | 20 | 1.15 |
| 1,2,3,4-tetrahydronaphthalene | 30 | 1.72 |
| Diphenylmethane | 20 | 1.15 |
| Dimethylnaphthalene | 15 | 0.86 |
| Stearic acid | 120 | 6.9 |
| Triethanolamine | 250 | 14.4 |
| Water | 1,200 | 69.0 |

| D | Gm. | Percent |
|---|---|---|
| Kerosene | 5,040 | 75 |
| m-Cresol | 25 | 0.37 |
| 2,4-xylenol | 30 | 0.45 |
| 1,2,3,4-tetrahydronaphthalene | 90 | 1.34 |
| Diphenylmethane | 100 | 1.49 |
| Dimethylnaphthalene | 85 | 1.26 |
| Triethanolamine | 300 | 4.47 |
| Stearic acid | 150 | 2.23 |
| Water | 900 | 13.4 |

| E | Gm. | Percent |
|---|---|---|
| Kerosene | 1,500 | 44.4 |
| m-Cresol | 2 | 0.06 |
| 2,4-xylenol | 2 | 0.06 |
| 1,2,3,4-tetrahydronaphthalene | 170 | 5.04 |
| Diphenylmethane | 170 | 5.04 |
| Dimethylnaphthalene | 170 | 5.04 |
| Triethanolamine | 120 | 3.56 |
| Stearic acid | 240 | 7.11 |
| Water | 1,000 | 29.6 |

| F | Gm. | Percent |
|---|---|---|
| Kerosene | 1,500 | 49.8 |
| m-Cresol | 60 | 2.0 |
| 2,4-xylenol | 60 | 2.0 |
| 1,2,3,4-tetrahydronaphthalene | 5 | 0.17 |
| Diphenylmethane | 10 | 0.32 |
| Dimethylnaphthalene | 15 | 0.5 |
| Triethanolamine | 120 | 4.0 |
| Stearic acid | 240 | 8.0 |
| Water | 1,000 | 33.2 |

| G | Gm. | Percent |
|---|---|---|
| Kerosene | 1,551.0 | 36.9 |
| m-Cresol | 38.8 | 0.92 |
| 2,4-xylenol | 38.5 | 0.92 |
| 1,2,3,4-tetrahydronaphthalene | 276.0 | 6.57 |
| Diphenylmethane | 285.0 | 6.78 |
| Dimethylnaphthalene | 288.0 | 6.85 |
| Stearic acid | 662.0 | 15.75 |
| Triethanolamine | 1,063.0 | 25.3 |

This composition is dispersed in water at the rate of 840 gm./gal. water to make an emulsion suitable for dipping rootstock.

| H | Gm. | Percent |
|---|---|---|
| Kerosene | 3,084.0 | 52.9 |
| m-Cresol | 38.8 | 0.66 |
| 2,4-xylenol | 38.5 | 0.66 |
| 1,2,3,4-tetrahydronaphthalene | 276.0 | 4.73 |
| Diphenylmethane | 285.0 | 4.89 |
| Dimethylnaphthalene | 288.0 | 4.93 |
| Stearic acid | 762.0 | 13.05 |
| Triethanolamine | 1,063.0 | 18.23 |

This composition is dispersed in water at the rate of 1167 gm./gal. water to make an emulsion suitable for dipping rootstock.

| I | Gm. | Percent |
|---|---|---|
| Kerosene | 1,551 | 28.43 |
| m-Cresol | 155 | 2.84 |
| 2,4-xylenol | 154 | 2.82 |
| 1,2,3,4-tetrahydronaphthalene | 552 | 10.10 |
| Diphenylmethane | 570 | 10.45 |
| Dimethylnaphthalene | 576 | 10.55 |
| Stearic acid | 728 | 13.35 |
| Triethanolamine | 1,169 | 21.4 |

This composition is dispersed in water at the rate of 1091 gm./gal. water to make an emulsion suitable for dipping root stock.

*Example 7*

An aqueous emulsion was prepared by mixing 1500 gm. kerosene, 110 gm. m-cresol, 110 gm. 2,4-xylenol, 450 gm. 1,2,3,4-tetrahydronaphthalene, 150 gm. diphenylmethane, 150 gm. dimethylnaphthalene, 150 gm. stearic acid, 300 gm. triethanolamine, 1200 gm. water, and 80 gm. pentachlorophenol.

The emulsion was applied to crown galls on hydrid walnut trees obtained by crossing the English walnut and black walnut (Paradox). The galls were killed.

I claim:

1. The process of controlling plant galls which comprises applying to the galls a plant gall controlling amount of a mixture comprising oil, cresol, and xylenol.

2. The process according to claim 1 wherein an aqueous emulsion comprising about 4.0 to about 75% oil, about 0.05 to about 3.0% cresol, about 0.05 to about 3.0% xylenol, and an emulsifying agent is applied.

3. The process according to claim 1 wherein the mixture comprises in addition to the oil, cresol, and xylenol, 1,2,3,4-tetrahydronaphthalene, diphenylmethane, and dimethylnaphthalene.

4. The process according to claim 2 wherein the aqueous emulsion includes in addition to the oil, cresol, xylenol, and emulsifying agent from about 0.05 to about 5.0% 1,2,3,4-tetrahydronaphthalene, from about 0.05 to about 5.0% diphenylmethane, and from about 0.05 to about 5.0% dimethylnaphthalene.

5. The process according to claim 4 wherein an aqueous emulsion comprising 45.5% kerosene, 0.29% m-cresol, 0.29% 2,4-xylenol, 0.33% 1,2,3,4-tetrahydronaphthalene, 0.34% diphenylmethane, 0.34% dimethylnaphthalene, 12.4% alkyl polyoxyethylene amine, 2.1% stearic acid, and 38.4% water is applied.

6. The process according to claim 4 wherein an aqueous emulsion comprising 54.66% kerosene, 0.46 m-cresol, 0.46% 2,4-xylenol, 2.16% 1,2,3,4-tetrahydronaphthalene, 2.23% diphenylmethane, 2.25% dimethylnaphthalene, 8.25% triethanolamine, 3.52% stearic acid, and 25.9% water is applied.

7. The process according to claim 4 wherein an aqueous emulsion comprising 54.8% kerosene, 0.23% m-cresol, 0.23% 2,4-xylenol, 1.08% 1,2,3,4-tetrahydronaphthalene, 1.11% diphenylmethane, 1.12% dimethylnaphthalene, 8.27% triethanolamine, 3.53% stearic acid, and 29.7% water is applied.

8. The process of controlling plant galls which comprises applying to the galls a plant gall controlling amount of a mixture comprising about 4.0 to about 75% kerosene, about 0.05 to about 3.0% m-cresol, and about 0.05 to about 3.0% 2,4-xylenol.

9. The process of controlling plant galls which comprises applying to the galls a plant gall controlling amount of an aqueous emulsion comprising about 30 to about 65% kerosene, about 0.1 to about 0.5% m-cresol, about 0.1 to about 0.5% 2,4-xylenol, and an emulsifying agent.

10. The process according to claim 9 wherein the aqueous emulsion includes in addition to kerosene, m-cresol, and 2,4-xylenol, from about 0.05% to about 5.0% of an arometic hydrocarbon, and the emulsifying agent is an alkyl polyoxyethylene amine.

11. The process according to claim 9 wherein about 0.1 to about 2.0% of each of 1,2,3,4-tetrahydronaphthalene, diphenylmethane, and dimethylnaphthalene are included in the aqueous emulsion.

12. An aqueous emulsion comprising about 4.0 to about 75% kerosene, about 0.05 to about 3.0% cresol, about 0.05 to about 2.0% xylenol, and an emulsifying agent.

13. An aqueous emulsion according to claim 12 including in addition to the koresene, m-cresol, 2,4-xylenol, and emulsifying agent, about 0.05 to about 5.0% 1,2,3,4-tetrahydronaphthalene, about 0.05 to about 5.0% diphenylmethane, and about 0.05 to about 5.0% dimethylnaphthalene.

14. An aqueous emulsion comprising 54.66% kerosene, 0.46% m-cresol, 0.46% 2,4-xylenol, 2.16% 1,2,3,4-tetrahydronaphthalene, 2.23% diphenylmethane, 2.25% dimethylnaphthalene, 8.25% triethanolamine, 3.52% stearic acid, and 25.9% water.

15. An aqueous emulsion comprising 54.8% kerosene, 0.23% m-cresol, 0.23% 2,4-xylenol, 1.08% 1,2,3,4-tetrahydronaphthalene, 1.11% dihpenylmethane, 1.12% dimethylnaphthalene, 8.27% triethanolamine, 3.53% stearic acid, and 29.7% water.

16. An aqueous emulsion comprising 45.5% kerosene, 0.29% m-cresol, 0.29% 2,4-xylenol, 0.33% 1,2,3,4-tetrahydronaphthalene, 0.34% diphenylmethane, 0.34% dimethylnaphthalene, 12.4% an alkyl polyoxyethylene amine, 2.1% stearic acid, and 38.4% water.

17. An aqueous emulsion comprising 60% kerosene, 0.2% m-cresol, 0.2% 2,4-xylenol, 12% alkyl polyoxyethylene amine and 27.6% water.

References Cited by the Examiner

UNITED STATES PATENTS 2,222,109  11/1940  Lindstaedt _____ 167—31

OTHER REFERENCES

Jordan: Chem. Abstracts, 31 (1937), page 2065.
Hyman: Chem. Abstracts 39 (1945), page 10012.
Soldatova: Chem. Abstracts 54, (1959), page 22838E.
Veno.: Chem. Abstracts 60 (1963), page 5716B.

JULIAN S. LEVITT, *Primary Examiner.*

STANLEY J. FRIEDMAN, *Assistant Examiner.*